United States Patent
Zhou (10) Patent No.: US 10,034,022 B2
(45) Date of Patent: Jul. 24, 2018

(54) METHOD AND SYSTEM FOR CONSTRAINING SLICE HEADER PROCESSING OVERHEAD IN VIDEO CODING

(71) Applicant: TEXAS INSTRUMENTS INCORPORATED, Dallas, TX (US)

(72) Inventor: Minhua Zhou, San Diego, CA (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 15/339,638

(22) Filed: Oct. 31, 2016

(65) Prior Publication Data
US 2017/0048555 A1 Feb. 16, 2017

Related U.S. Application Data (63) Continuation of application No. 14/012,922, filed on Aug. 28, 2013, now Pat. No. 9,485,506.
(Continued)

(51) Int. Cl.
| | |
|---|---|
| *H04N 7/12* | (2006.01) |
| *H04N 11/02* | (2006.01) |
| *H04N 11/04* | (2006.01) |
| *H04N 19/61* | (2014.01) |
| *H04N 19/119* | (2014.01) |
| *H04N 19/172* | (2014.01) |
| *H04N 19/157* | (2014.01) |
| *H04N 19/124* | (2014.01) |

(Continued)

(52) U.S. Cl.
CPC ......... *H04N 19/61* (2014.11); *H04N 19/119* (2014.11); *H04N 19/124* (2014.11); *H04N 19/13* (2014.11); *H04N 19/15* (2014.11); *H04N 19/157* (2014.11); *H04N 19/172* (2014.11); *H04N 19/625* (2014.11); *H04N 19/86* (2014.11); *H04N 19/174* (2014.11); *H04N 19/176* (2014.11); *H04N 19/184* (2014.11); *H04N 19/463* (2014.11)

(58) Field of Classification Search
None
See application file for complete search history.

(56) References Cited

U.S. PATENT DOCUMENTS

| | | | |
|---|---|---|---|
| 6,240,103 B1 * | 5/2001 | Schoenblum | ........ H04B 7/2612 348/423.1 |
| 2002/0036716 A1 | 3/2002 | Ito et al. | |

(Continued)

OTHER PUBLICATIONS

Thomas Wiegand et al, "WD3: Working Draft 3 of High-Efficiency Video Coding", JCTVC-E603, Joint Collaborative Team on Video Coding (JCT-VC) of ITU-T SG16 WP3 and ISO/IEC JTC1/SC29/WG11, Mar. 16-23, 2011, Geneva, Switzerland (215 pages).

(Continued)

*Primary Examiner* — Talha M Nawaz
(74) *Attorney, Agent, or Firm* — Gregory J. Albin; Charles A. Brill; Frank D. Cimino (57) ABSTRACT

A method for encoding a picture of a video sequence in a bit stream that constrains slice header processing overhead is provided. The method includes computing a maximum slice rate for the video sequence, computing a maximum number of slices for the picture based on the maximum slice rate, and encoding the picture wherein a number of slices used to encode the picture is enforced to be no more than the maximum number of slices.

7 Claims, 6 Drawing Sheets

Related U.S. Application Data (60) Provisional application No. 61/704,648, filed on Sep. 24, 2012, provisional application No. 61/699,474, filed on Sep. 11, 2012.

(51) Int. Cl.
  *H04N 19/13*       (2014.01)
  *H04N 19/15*       (2014.01)
  *H04N 19/625*      (2014.01)
  *H04N 19/86*       (2014.01)
  H04N 19/463      (2014.01)
  H04N 19/174      (2014.01)
  H04N 19/176      (2014.01)
  H04N 19/184      (2014.01)

(56) References Cited

U.S. PATENT DOCUMENTS

| | | | |
|---|---|---|---|
| 2003/0028879 A1 | 2/2003 | Gordon et al. | |
| 2008/0253448 A1* | 10/2008 | Lin | H04N 19/15 375/240.03 |
| 2008/0317131 A1* | 12/2008 | Lee | H04N 19/176 375/240.16 |
| 2010/0225655 A1* | 9/2010 | Tung | G06T 1/20 345/522 |
| 2012/0027134 A1* | 2/2012 | Gladwin | H04L 1/0045 375/340 |
| 2012/0039386 A1* | 2/2012 | Srinivasamurthy | H04N 19/00096 375/240.03 |
| 2012/0069857 A1* | 3/2012 | Forster | H04H 20/30 370/498 |
| 2012/0230397 A1 | 9/2012 | Ouedraogo et al. | |
| 2014/0003498 A1 | 1/2014 | Sullivan | |
| 2014/0003525 A1 | 1/2014 | Fuldseth | |

OTHER PUBLICATIONS

Benjamin Bross et al, "WD4: Working Draft 4 of High-Efficiency Video Coding", JCTVC-F803_d6, Joint Collaborative Team on Video Coding (JCT-VC) of ITU-T SG16 WP3 and ISO/IEC JTC1/SC29/WG11, Jul. 14-22, 2011, Torino, Italy (229 pages).

Benjamin Bross et al, "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, Nov. 21-30, 2011, Geneva, Switzerland (237 pages).

Benjamin Bross et al, "High Efficiency Video Coding (HEVC) Text Specification Draft 6", JCTVC-H1003, Joint Collaborative Team on Video Coding (JCT-VC) of ITU-T SG16 WP3 and ISO/IEC JTC1/SC29/WG11, Nov. 21-30, 2011, Geneva, Switzerland (259 pages).

Benjamin Bross et al, "High Efficiency Video Coding (HEVC) Text Specification Draft 7", JCTVC-I1003_d9, Joint Collaborative Team on Video Coding (JCT-VC) of ITU-T SG16 WP3 and ISO/IEC JTC1/SC29/WG11, Apr. 27-May 7, 2012, Geneva, Switzerland (280 pages).

Benjamin Bross et al, "High Efficiency Video Coding (HEVC) Text Specification Draft 8", JCTVC-J1003_d7, Joint Collaborative Team on Video Coding (JCT-VC) of ITU-T SG16 WP3 and ISO/IEC JTC1/SC29/WG11, Jul. 11, 20, 2012, Stockholm, Sweden (260 pages).

Minhua Zhou, "AHG9: On Number of Slices Constraint", JCTVC-K0201, Joint Collaborative Team on Video Coding (JCT-VC) of ITU-T SG16 WP3 and ISO/IEC JTC1/SC29/WG11, pp. 1-2, Oct. 10-19, 2012, Shanghai, China.

Minhua Zhou, "AHG9: On Number of Slices Constraint", JCTVC-K0201 presentation, Joint Collaborative Team on Video Coding (JCT-VC) of ITU-T SG16 WP3 and ISO/IEC JTC1/SC29/WG11, pp. 1-4, Oct. 10-19, 2012, Shanghai, China.

Benjamin Bross et al, "High Efficiency Video Coding (HEVC) Text Specification Draft 9", JCTVC-K1003_v13, Joint Collaborative Team on Video Coding (JCT-VC) of ITU-T SG16 WP3 and ISO/IEC JTC1/SC29/WG11, Oct. 10-19, 2012, Shanghai, China (317 pages).

Benjamin Bross et al, High Efficiency Video Coding (HEVC) Text Specification Draft 10 (for FDIS & Last Call), JCTVC-L1003_v34, Joint Collaborative Team on Video Coding (JCT-VC) of ITU-T 5G16 WP3 and ISO/IEC JTC1/SC29/WG11, Jan. 14-23, 2013, Geneva, Switzerland (310 pages).

"TMS320DM6467 Digital Media System-on-Chip", SPRS403G, Texas Instruments Incorporated, Dec. 2007, revised Oct. 2010 (355 pages).

Prosecution History from U.S. Appl. No. 14/012,922 dated Aug. 28, 2013 to Oct. 13, 2016, 122 pp.

\* cited by examiner

FIG. 1
(PRIOR ART)

| | | | | | | | | | | | | | | |
|---|---|---|---|---|---|---|---|---|---|---|---|---|---|---|
| MAX NUMBER OF TILE COLUMNS MaxTileCols | | 1 | 1 | 1 | 2 | 3 | 5 | 5 | 10 | 10 | 10 | 20 | 20 | 20 |
| MAX NUMBER OF TILE ROWS MaxTileRows | | 1 | 1 | 1 | 2 | 3 | 5 | 5 | 11 | 11 | 11 | 22 | 22 | 22 |
| MAX SLICES PER PICTURE MaxSlicesPerPicture | | 16 | 16 | 20 | 30 | 40 | 75 | 75 | 200 | 200 | 200 | 600 | 600 | 600 |
| MIN COMPRESSION RATIO MinCR | | 2 | 2 | 2 | 2 | 2 | 4 | 4 | 6 | 8 | 8 | 8 | 8 | 6 |
| MAX CPB SIZE MaxCPB (1000 BITS) | HIGH TIER | - | - | - | - | - | 30 000 | 50 000 | 100 000 | 160 000 | 240 000 | 240 000 | 480 000 | 800 000 |
| | MAIN TIER | 350 | 1 500 | 3 000 | 6 000 | 10 000 | 12 000 | 20 000 | 25 000 | 40 000 | 60 000 | 60 000 | 120 000 | 240 000 |
| MAX BIT RATE MaxBR (1000 BITS/S) | HIGH TIER | - | - | - | - | - | 30 000 | 50 000 | 100 000 | 160 000 | 240 000 | 240 000 | 480 000 | 800 000 |
| | MAIN TIER | 128 | 1 500 | 3 000 | 6 000 | 10 000 | 12 000 | 20 000 | 25 000 | 40 000 | 60 000 | 60 000 | 120 000 | 240 000 |
| MAX LUMA PICTURE SIZE MaxLumaPS (SAMPLES) | | 36 864 | 122 880 | 245 760 | 552 960 | 983 040 | 2 228 224 | 2 228 224 | 8 912 896 | 8 912 896 | 8 912 896 | 33 423 360 | 33 423 360 | 33 423 360 |
| MAX LUMA SAMPLE RATE MaxLumaSR (SAMPLES/SEC) | | 552 960 | 3 686 400 | 7 372 800 | 16 588 800 | 33 177 600 | 66 846 720 | 133 693 440 | 267 386 880 | 534 773 760 | 1 069 547 520 | 1 069 547 520 | 2 005 401 600 | 4 010 803 200 |
| LEVEL | | 1 | 2 | 2.1 | 3 | 3.1 | 4 | 4.1 | 5 | 5.1 | 5.2 | 6 | 6.1 | 6.2 |

METHOD AND SYSTEM FOR CONSTRAINING SLICE HEADER PROCESSING OVERHEAD IN VIDEO CODING

CROSS-REFERENCE TO RELATED APPLICATIONS

This application is a continuation of U.S. patent application Ser. No. 14/012,922, filed Aug. 28, 2013, which claims benefit to U.S. Provisional Patent Application Ser. No. 61/699,474, filed Sep. 11, 2012, and U.S. Provisional Patent Application Ser. No. 61/704,648, filed Sep. 24, 2012, all of which are incorporated herein by reference in their entirety.

BACKGROUND OF THE INVENTION

Field of the Invention

Embodiments of the present invention generally relate to constraining slice header processing overhead in video coding.

Description of the Related Art

The Joint Collaborative Team on Video Coding (JCT-VC) of ITU-T WP3/16 and ISO/IEC JTC 1/SC 29/WG 11 is currently developing the next-generation video coding standard referred to as High Efficiency Video Coding (HEVC). Similar to previous video coding standards such as H.264/AVC, HEVC is based on a hybrid coding scheme using block-based prediction and transform coding. First, the input signal is split into rectangular blocks that are predicted from the previously decoded data by either motion compensated (inter) prediction or intra prediction. The resulting prediction error is coded by applying block transforms based on an integer approximation of the discrete cosine transform, which is followed by quantization and coding of the transform coefficients.

Similar to prior video coding standards, a picture may be subdivided into one or more independently decodable slices. A slice header is transmitted for each slice. This header contains high-level parameters for decoding the data in the associated slice. Such parameters may include, for example, a picture order counter, reference picture parameter sets, SAO (sample adaptive offset) control parameters, reference picture list parameters and modification parameters, de-blocking filter control parameters, a weighted prediction table, in-loop filter slice on/off control flag, and sub-stream entries, etc.

The processing overhead associated with a slice header includes slice header parsing, slice-level operations such as reference picture list re-ordering, and CABAC resets. In typical video decoder designs, slice header parsing and operations such as reference picture list re-ordering are implemented in software for flexibility and error resiliency reasons. What software can do is fairly limited. Therefore, processing slice headers may introduce significant overhead for real-time decoder implementations if a bit stream contains the maximum number of slices permitted by the standard. Accordingly, constraining the overhead of slice header parsing is desirable.

SUMMARY

Embodiments of the present invention relate to methods, apparatus, and computer readable media that constrain slide header processing overhead as compared to the prior art. In one aspect, a method for encoding a picture of a video sequence in a bit stream is provided that includes computing a maximum slice rate for the video sequence, computing a maximum number of slices for the picture based on the maximum slice rate, and encoding the picture wherein a number of slices used to encode the picture is enforced to be no more than the maximum number of slices.

In one aspect, a method for encoding a picture of a video sequence in a bit stream is provided that includes determining a level for the video sequence, computing a maximum slice rate for the video sequence as MaxLumaSR/MaxLumaPS*MaxSlicesPerPicture, wherein MaxLumaSR is a maximum luma sample rate specified for the level, MaxLumaPS is a maximum luma picture size in samples specified for the level, and MaxSlicesPerPicture is a maximum number of slices per picture specified for the level, computing a maximum number of slices for the picture as a minimum of MaxSlicesPerPicture and the maximum slice rate divided by a frame rate of the video sequence when the frame rate is fixed, computing a maximum number of slices for the picture as a minimum of MaxSlicesPerPicture and the maximum slice rate multiplied by a difference in display time between the picture and a picture immediately preceding the picture in display order when the frame rate is variable, and encoding the picture wherein a number of slices used to encode the picture is constrained to be no more than the maximum number of slices.

In one aspect, an apparatus configured to encode a picture of a video sequence in a bit stream is provided that includes means for computing a maximum slice rate for the video sequence, means for computing a maximum number of slices for the picture based on the maximum slice rate, and means for encoding the picture wherein a number of slices used to encode the picture is enforced to be no more than the maximum number of slices.

BRIEF DESCRIPTION OF THE DRAWINGS

Particular embodiments will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

As used herein, the term "picture" may refer to a frame or a field of a frame. A frame is a complete image captured during a known time interval. For convenience of description, embodiments are described herein in reference to HEVC. One of ordinary skill in the art will understand that embodiments of the invention are not limited to HEVC.

In HEVC, a largest coding unit (LCU) is the base unit used for block-based coding. A picture is divided into non-overlapping LCUs. That is, an LCU plays a similar role in coding as the macroblock of H.264/AVC, but it may be larger, e.g., 32×32, 64×64, etc. An LCU may be partitioned into coding units (CU). A CU is a block of pixels within an LCU and the CUs within an LCU may be of different sizes. The partitioning is a recursive quadtree partitioning. The quadtree is split according to various criteria until a leaf is reached, which is referred to as the coding node or coding unit. The maximum hierarchical depth of the quadtree is determined by the size of the smallest CU (SCU) permitted. The coding node is the root node of two trees, a prediction tree and a transform tree. A prediction tree specifies the position and size of prediction units (PU) for a coding unit. A transform tree specifies the position and size of transform units (TU) for a coding unit. A transform unit may not be larger than a coding unit and the size of a transform unit may be, for example, 4×4, 8×8, 16×16, and 32×32. The sizes of the transforms units and prediction units for a CU are determined by the video encoder during prediction based on minimization of rate/distortion costs.

Various versions of HEVC are described in the following documents, which are incorporated by reference herein: T. Wiegand, et al., "WD3: Working Draft 3 of High-Efficiency Video Coding," JCTVC-E603, Joint Collaborative Team on Video Coding (JCT-VC) of ITU-T SG16 WP3 and ISO/IEC JTC1/SC29/WG11, Geneva, CH, Mar. 16-23, 2011 ("WD3"), B. Bross, et al., "WD4: Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, Torino, IT, Jul. 14-22, 2011 ("WD4"), B. Bross. et al., "WD5: Working Draft 5 of High-Efficiency Video Coding," JCTVC-G1103_d9, Joint Collaborative Team on Video Coding (JCT-VC) of ITU-T SG16 WP3 and ISO/IEC JTC1/SC29/WG11, Geneva, CH, Nov. 21-30, 2011 ("WD5"), B. Bross, et al., "High Efficiency Video Coding (HEVC) Text Specification Draft 6," JCTVC-H1003_dK, Joint Collaborative Team on Video Coding (JCT-VC) of ITU-T SG16 WP3 and ISO/IEC JTC1/SC29/WG1, San Jose, Calif., Feb. 1-10, 2012, ("HEVC Draft 6"), B. Bross, et al., "High Efficiency Video Coding (HEVC) Text Specification Draft 7," JCTVC-I1003_d9, Joint Collaborative Team on Video Coding (JCT-VC) of ITU-T SG16 WP3 and ISO/IEC JTC1/SC29/WG1, Geneva, CH, Apr. 17-May 7, 2012 ("HEVC Draft 7"), B. Bross, et al., "High Efficiency Video Coding (HEVC) Text Specification Draft 8," JCTVC-J1003_d7, Joint Collaborative Team on Video Coding (JCT-VC) of ITU-T SG16 WP3 and ISO/IEC JTC1/SC29/WG1, Stockholm, SE, Jul. 11-20, 2012 ("HEVC Draft 8"), B. Bross, et al., "High Efficiency Video Coding (HEVC) Text Specification Draft 9," JCTVC-K1003_v13, Joint Collaborative Team on Video Coding (JCT-VC) of ITU-T SG16 WP3 and ISO/IEC JTC1/SC29/WG1, Shanghai, CN, Oct. 10-19, 2012 ("HEVC Draft 9"), and B. Bross, et al., "High Efficiency Video Coding (HEVC) Text Specification Draft 10 (for FDIS & Last Call)," JCTVC-L1003_v34, Joint Collaborative Team on Video Coding (JCT-VC) of ITU-T SG16 WP3 and ISO/IEC JTC1/SC29/WG1, Geneva, CH, Jan. 14-23, 2013 ("HEVC Draft 10").

Some aspects of this disclosure have been presented to the JCT-VC in M. Zhou, "AHG9: On Number of Slices Constraint," JCTVC-K0201, Joint Collaborative Team on Video Coding (JCT-VC) of ITU-T SG16 WP3 and ISO/IEC JTC1/SC29/WG1, Shanghai, China, Oct. 10-19, 2012, which is incorporated by reference herein in its entirety.

As previously mentioned, constraining the overhead of parsing slice headers is desirable. In the prior art HEVC specification, HEVC Draft 8, to address the slice header processing overhead issue, in bitstreams conforming to the Main profile of HEVC, the number of slices in a picture is restricted to be is less than or equal to a maximum number of slices, referred to as MaxSlicesPerPicture. The value of MaxSlicesPerPicture is level dependent and is specified in Table A-1 of HEVC Draft 8. This table is replicated in FIG. 1. In HEVC (and other video coding standards), a profile specifies a set of coding tools that are supported by the profile, and a level specifies parameter constraints such as maximum sample rate, maximum bit-rate, maximum picture size, etc.

For any given level, a complaint decoder may need to support real-time decoding of video bit streams with different frame-rates and/or picture sizes. For example, level 5 in the table of FIG. 1 supports 4K×2K@30 (4K×2K pictures at 30 frames per second) and the maximum number of slices per second is 6000 slices/sec, i.e., 30 frames/sec multiplied by 200 slices/frame. For the same maximum sample rate constraint of level 5, a level 5 compliant decoder also needs to be able to decode video bit streams at, for example, 1080p@120 and 720p@240, in real-time. Because only the maximum number of slices per picture is fixed (200 per picture in this case), the worst case number of slices per second increases to 24000 slices/sec, i.e., 120 frames/sec multiplied by 200 slices/frame, and 48000 slices/sec, i.e., 240 frames/sec multiplied by 200 slices/frame, for 1080p@120 and 720p@240, respectively. Thus, the worst case slice header processing overhead can vary for a level based on the frame rate of the incoming compressed video bit stream, which imposes a huge burden for designing a real-time decoder which is required to deal with worst cases. Therefore, merely limiting the maximum number of slices per picture is not sufficient for constraining slice header processing overhead, because the overhead increases proportionally to the frame-rate of a coded sequence.

Figure 1:
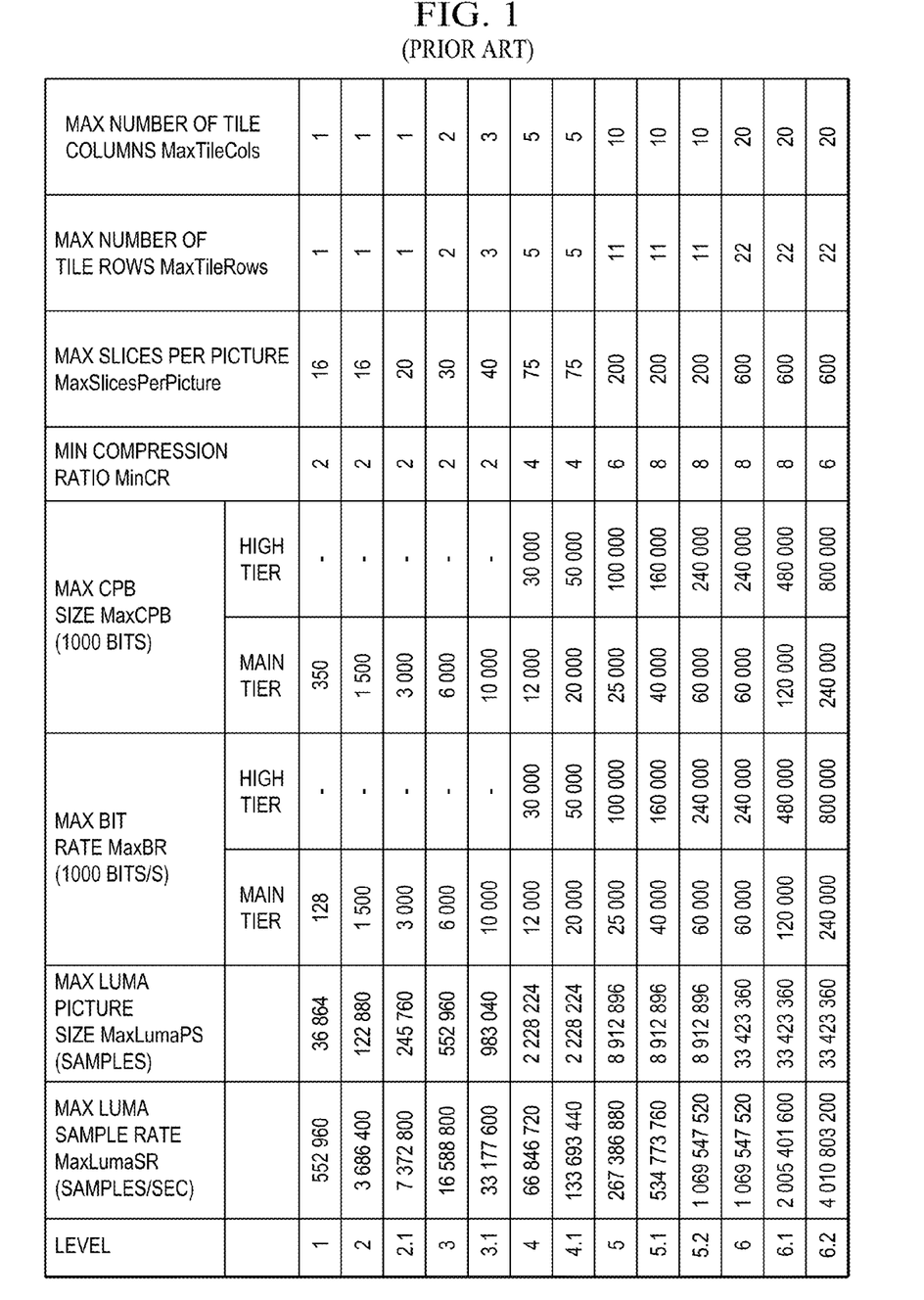
FIG. 1 is an example level table for a profile.

Embodiments of the invention provide for constraining the worst case number of slices per second rate to be constant for a level. The worst case number of slices per second rate (MaxSliceRate) for a level may be defined as $$\text{MaxSliceRate} = \text{MaxLumaSR} / \text{MaxLumaPS} * \text{MaxSlicesPerPicture}$$

where MaxLumaSR is the maximum luma sample rate, MaxLumaPS is the maximum luma picture size in samples, and MaxSlicesPerPicture is the maximum number of slices in a picture. Example values of MaxLumaSR, MaxLumaPS and MaxSlicesPerPicture for each level are shown in the example level table of FIG. 1. One of ordinary skill in the art will understand embodiments in which other suitable values are used and/or in which more or fewer levels are specified for a profile. One of ordinary skill in the art will also understand that the parameters used to compute the maximum slice rate may differ depending upon the particular parameters defined for levels.

Figure 2:
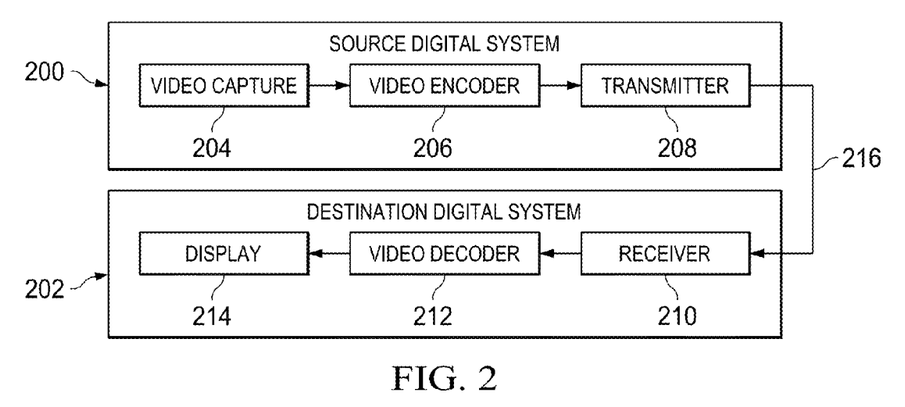
FIG. 2 is a block diagram of a digital system.

FIG. 2 shows a block diagram of a digital system that includes a source digital system 200 that transmits encoded video sequences to a destination digital system 202 via a communication channel 216. The source digital system 200 includes a video capture component 204, a video encoder component 206, and a transmitter component 208. The video capture component 204 is configured to provide a video sequence to be encoded by the video encoder component 206. The video capture component 204 may be, for example, a video camera, a video archive, or a video feed from a video content provider. In some embodiments, the video capture component 204 may generate computer graphics as the video sequence, or a combination of live video, archived video, and/or computer-generated video.

The video encoder component 206 receives a video sequence from the video capture component 204 and encodes it for transmission by the transmitter component 208. The video encoder component 206 receives the video sequence from the video capture component 204 as a sequence of pictures, divides the pictures into largest coding units (LCUs), and encodes the video data in the LCUs. The video encoder component 206 may be configured to comply with a worst case number of slices per second rate during the encoding process as described herein. An embodiment of the video encoder component 206 is described in more detail herein in reference to FIGS. 3A and 3B.

The transmitter component 208 transmits the encoded video data to the destination digital system 202 via the communication channel 216. The communication channel 216 may be any communication medium, or combination of communication media suitable for transmission of the encoded video sequence, such as, for example, wired or wireless communication media, a local area network, or a wide area network.

The destination digital system 202 includes a receiver component 210, a video decoder component 212 and a display component 214. The receiver component 210 receives the encoded video data from the source digital system 200 via the communication channel 216 and provides the encoded video data to the video decoder component 212 for decoding. The video decoder component 212 reverses the encoding process performed by the video encoder component 206 to reconstruct the LCUs of the video sequence. The video decoder component 212 may be configured to confirm compliance with a worst case number of slices per second rate during the decoding process as described herein. An embodiment of the video decoder component 212 is described in more detail below in reference to FIG. 4.

The reconstructed video sequence is displayed on the display component 214. The display component 214 may be any suitable display device such as, for example, a plasma display, a liquid crystal display (LCD), a light emitting diode (LED) display, etc.

In some embodiments, the source digital system 200 may also include a receiver component and a video decoder component and/or the destination digital system 202 may include a transmitter component and a video encoder component for transmission of video sequences both directions for video streaming, video broadcasting, and video telephony. Further, the video encoder component 206 and the video decoder component 212 may perform encoding and decoding in accordance with one or more video compression standards. The video encoder component 206 and the video decoder component 212 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc.

Figure 3A:
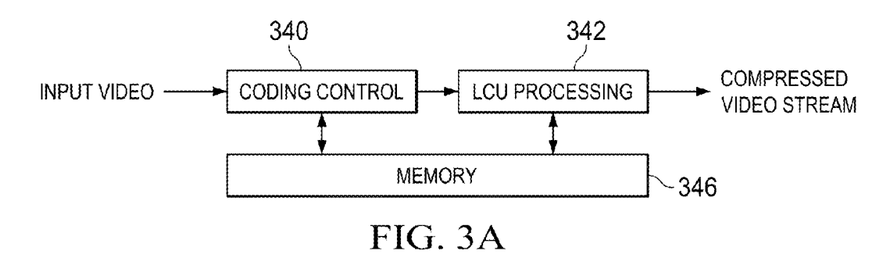
FIGS. 3A and 3B are a block diagram of an example video encoder.
Figure 3B:
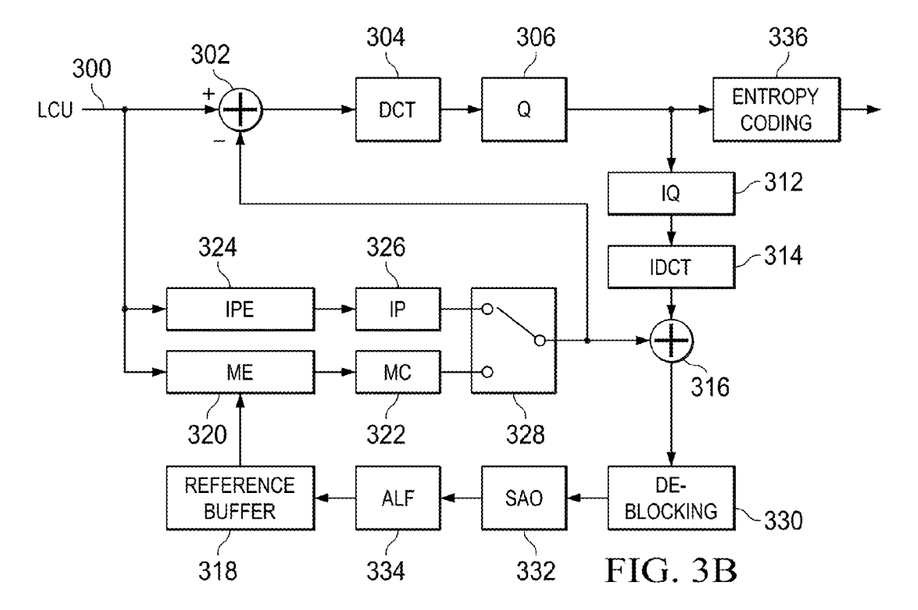

FIGS. 3A and 3B show block diagrams of an example video encoder configured to constrain the slice rate per picture during the encoding process to be less than or equal to a worst case number of slices per second rate. FIG. 3A shows a high level block diagram of the video encoder and FIG. 3B shows a block diagram of the LCU processing component 642 of the video encoder. As shown in FIG. 3A, the video encoder includes a coding control component 340, an LCU processing component 342, and a memory 346. The memory 346 may be internal (on-chip) memory, external (off-chip) memory, or a combination thereof. The memory 346 may be used to communicate information between the various components of the video encoder.

An input digital video sequence is provided to the coding control component 340. The coding control component 340 sequences the various operations of the video encoder, i.e., the coding control component 340 runs the main control loop for video encoding. For example, the coding control component 340 performs processing on the input video sequence that is to be done at the picture level, such as determining the coding type (I, P, or B) of a picture based on a high level coding structure, e.g., IPPP, IBBP, hierarchical-B, and dividing a picture into LCUs for further processing.

In addition, for pipelined architectures in which multiple LCUs may be processed concurrently in different components of the LCU processing, the coding control component 340 controls the processing of the LCUs by various components of the LCU processing in a pipeline fashion. For example, in many embedded systems supporting video processing, there may be one master processor and one or more slave processing modules, e.g., hardware accelerators. The master processor operates as the coding control component and runs the main control loop for video encoding, and the slave processing modules are employed to off load certain compute-intensive tasks of video encoding such as motion estimation, motion compensation, intra prediction mode estimation, transformation and quantization, entropy coding, and loop filtering. The slave processing modules are controlled in a pipeline fashion by the master processor such that the slave processing modules operate on different LCUs of a picture at any given time. That is, the slave processing modules are executed in parallel, each processing its respective LCU while data movement from one processor to another is serial.

The coding control component 340 also determines the profile and level within the profile for the video sequence to be encoded. Typically, an encoder is designed for a particular profile. For example, HEVC currently defines two profiles: the Main profile for 8-bit video and the Main-10 profile for 8-bit and 10-bit video. If the encoder is designed for only the Main profile, then the profile of any incoming 8-bit video will be the Main profile. If the encoder is designed for the Main-10 profile, then the profile of an incoming video sequence is set based on the bit-depth of the video. That is, if the video is 8-bit video, then the profile will be the Main profile, and if the video is 10-bit video, then the profile will be the Main-10 profile. Typically, the encoder selects a level from the profile that is the minimum level satisfying the picture size, frame rate, bit-rate, etc. of the incoming video sequence as the desired result is to select a level that communicates to a decoder the minimum capability needed to decode the resulting compressed bit stream.

Once the profile and level are determined, the coding control component 340 computes a maximum slice rate (maximum number of slices per second) for pictures in the video sequence based on parameter values defined for the level. Computation of the maximum slice rate is previously discussed herein.

The coding control component 340 then constrains the slice rate for each picture to be less than or equal to the maximum slice rate. In some embodiments, the coding control component 340 constrains the slice rate by computing a maximum number of slices for each picture based on the maximum slice rate constraint and then restricting the number of slices used in encoding of the picture to be less than or equal to the computed maximum slice number. More specifically, for each fixed frame rate picture, the coding control component 340 computes the maximum number of slices for the picture as $$\min(\text{MaxSlicesPerPicture}, \text{MaxSliceRate}/\text{FrameRate})$$

where the value of MaxSliceRate is the maximum slice rate computed as previously described, and min(a, b) returns the minimum value of a and b. As previously mentioned, MaxSlicesPerPicture is the maximum number of slices in a picture. Note that a picture should contain at least one slice, thus the minimum value of the maximum number of slices in a picture is one.

Figure 7:
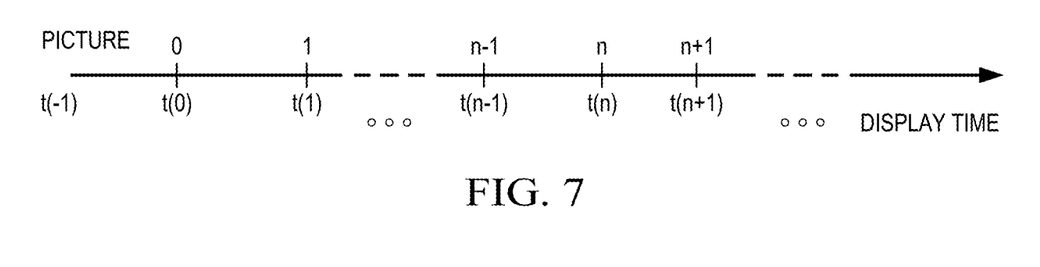
FIG. 7 is an example variable frame rate sequence.

For each variable frame rate picture, the coding control component 340 computes the maximum number of slices for the picture as $$\min(\text{MaxSlicesPerPicture}, \text{MaxSliceRate}*(t(n)-t(n-1)))$$

where t(n) is the display time of picture n in display order. For the first picture in the sequence (i.e., n=0), the intitial display time, i.e, t(−1), can be determined by the initial specified delays. FIG. 7 shows an example variable frame rate sequence.

The operation of the coding control component 340 to constrain the number of slices in a picture to be less than or equal to the computed maximum number of slices for the picture may be performed in any suitable way and may depend on the application using the video encoder. There are many techniques for constraining the number of slices in a picture currently known in the art. Note that a slice is some integer number of LCUs. For example, in some video conferencing applications, each packet is limited to some number of bytes, e.g., 1500. To avoid packet fragmentation, a packet normally contains a slice; thus the number of bits in a slice is capped at the packet size limit. In this case, the coding control component 340 tracks the total number of consumed bits of a current slice after encoding the current LCU. If the total number of bits exceeds the slice cap, the coding control component 340 starts a new slice and causes the current LCU to be encoded again as the first LCU of the new slice. In addition, the coding control component 340 monitors the total slice count for a picture. If the total number of slices inserted into the current picture is approaching the computed maximum number of slices for the picture, the coding control component 340 may cause the remainder of LCUs in the picture to be more coarsely quantized such that a slice can contain more LCUs within the slice cap limit, and the total number of slices for the picture would not exceed the maximum.

In another example, the coding control component 340 may select a total number of slices N for the current picture to be less than or equal to the computed maximum number of slices for that picture and cause the picture to be encoded into N slices, each with the approximately the same number of number of LCUs. When a current slice contains the pre-determined number of LCUs, the coding control component 340 causes the current slice to terminate and starts a new slice.

FIG. 3B is a block diagram of the LCU processing component 342. The LCU processing component 342 receives LCUs 300 of the input video sequence from the coding control component and encodes the LCUs 300 under the control of the coding control component 340 to generate the compressed video stream. The LCUs 300 in each picture are processed in row order. The LCUs 300 from the coding control component are provided as one input of a motion estimation component (ME) 320, as one input of an intra-prediction estimation component (IPE) 324, and to a positive input of a combiner 302 (e.g., adder or subtractor or the like). Further, although not specifically shown, the prediction mode of each picture as selected by the coding control component 340 is provided to a mode decision component 328 and the entropy coding component 336.

The storage component 318 provides reference data to the motion estimation component 320 and to the motion compensation component 322. The reference data may include one or more previously encoded and decoded pictures, i.e., reference pictures. Both list 0 and list 1 reference pictures may be stored by the storage component 318.

The motion estimation component 320 provides motion data information to the motion compensation component 322 and the entropy coding component 336. More specifically, the motion estimation component 320 performs tests on CUs in an LCU based on multiple inter-prediction modes (e.g., skip mode, merge mode, and normal or direct inter-prediction), PU sizes, and TU sizes using reference picture data from storage 318 to choose the best CU partitioning, PU/TU partitioning, inter-prediction modes, motion vectors, etc. based on coding cost, e.g., a rate distortion coding cost. To perform the tests, the motion estimation component 320 may divide an LCU into CUs according to the maximum hierarchical depth of the quadtree, and divide each CU into PUs according to the unit sizes of the inter-prediction modes and into TUs according to the transform unit sizes, and calculate the coding costs for each PU size, prediction mode, and transform unit size for each CU. The motion estimation component 320 provides the motion vector (MV) or vectors and the prediction mode for each PU in the selected CU partitioning to the motion compensation component (MC) 322.

The motion compensation component 322 receives the selected inter-prediction mode and mode-related information from the motion estimation component 320 and generates the inter-predicted CUs. The inter-predicted CUs are provided to the mode decision component 328 along with the selected inter-prediction modes for the inter-predicted PUs and corresponding TU sizes for the selected CU/PU/TU partitioning. The coding costs of the inter-predicted CUs are also provided to the mode decision component 328.

The intra-prediction estimation component 324 (IPE) performs intra-prediction estimation in which tests on CUs in an LCU based on multiple intra-prediction modes, PU sizes, and TU sizes are performed using reconstructed data from previously encoded neighboring CUs stored in a buffer (not shown) to choose the best CU partitioning, PU/TU partitioning, and intra-prediction modes based on coding cost, e.g., a rate distortion coding cost. To perform the tests, the intra-prediction estimation component 324 may divide an LCU into CUs according to the maximum hierarchical depth of the quadtree, and divide each CU into PUs according to the unit sizes of the intra-prediction modes and into TUs according to the transform unit sizes, and calculate the coding costs for each PU size, prediction mode, and transform unit size for each PU. The intra-prediction estimation component 324 provides the selected intra-prediction modes for the PUs and the corresponding TU sizes for the selected CU partitioning to the intra-prediction component (IP) 326. The coding costs of the intra-predicted CUs are also provided to the intra-prediction component 326.

The intra-prediction component 326 (IP) receives intra-prediction information, e.g., the selected mode or modes for the PU(s), the PU size, etc., from the intra-prediction estimation component 324 and generates the intra-predicted CUs. The intra-predicted CUs are provided to the mode decision component 328 along with the selected intra-prediction modes for the intra-predicted PUs and corresponding TU sizes for the selected CU/PU/TU partitioning. The coding costs of the intra-predicted CUs are also provided to the mode decision component 328.

The mode decision component 328 selects between intra-prediction of a CU and inter-prediction of a CU based on the intra-prediction coding cost of the CU from the intra-prediction component 326, the inter-prediction coding cost of the CU from the motion compensation component 322, and the picture prediction mode provided by the coding control component. Based on the decision as to whether a CU is to be intra- or inter-coded, the intra-predicted PUs or inter-predicted PUs are selected. The selected CU/PU/TU partitioning with corresponding modes and other mode related prediction data (if any) such as motion vector(s) and reference picture index (indices), are provided to the entropy coding component 336.

The output of the mode decision component 328, i.e., the predicted PUs, is provided to a negative input of the combiner 302 and to the combiner 338. The associated transform unit size is also provided to the transform component 304. The combiner 302 subtracts a predicted PU from the original PU. Each resulting residual PU is a set of pixel difference values that quantify differences between pixel values of the original PU and the predicted PU. The residual blocks of all the PUs of a CU form a residual CU for further processing.

The transform component 304 performs block transforms on the residual CUs to convert the residual pixel values to transform coefficients and provides the transform coefficients to a quantize component 306. More specifically, the transform component 304 receives the transform unit sizes for the residual CU and applies transforms of the specified sizes to the CU to generate transform coefficients. Further, the quantize component 306 quantizes the transform coefficients based on quantization parameters (QPs) and quantization matrices provided by the coding control component and the transform sizes and provides the quantized transform coefficients to the entropy coding component 336 for coding in the bit stream.

The entropy coding component 336 entropy encodes the relevant data, i.e., syntax elements, output by the various encoding components and the coding control component using context-adaptive binary arithmetic coding (CABAC) to generate the compressed video bit stream. Among the syntax elements that are encoded are picture parameter sets, slice headers, flags indicating the CU/PU/TU partitioning of an LCU, the prediction modes for the CUs, and the quantized transform coefficients for the CUs. The entropy coding component 336 also entropy encodes relevant data from the in-loop filters, such as the SAO parameters.

The LCU processing includes an embedded decoder. As any compliant decoder is expected to reconstruct an image from a compressed bit stream, the embedded decoder provides the same utility to the video encoder. Knowledge of the reconstructed input allows the video encoder to transmit the appropriate residual energy to compose subsequent pictures.

The quantized transform coefficients for each CU are provided to an inverse quantize component (IQ) 312, which outputs a reconstructed version of the transform result from the transform component 304. The dequantized transform coefficients are provided to the inverse transform component (IDCT) 314, which outputs estimated residual information representing a reconstructed version of a residual CU. The inverse transform component 314 receives the transform unit size used to generate the transform coefficients and applies inverse transform(s) of the specified size to the transform coefficients to reconstruct the residual values. The reconstructed residual CU is provided to the combiner 338.

The combiner 338 adds the original predicted CU to the residual CU to generate a reconstructed CU, which becomes part of reconstructed picture data. The reconstructed picture data is stored in a buffer (not shown) for use by the intra-prediction estimation component 324.

Various in-loop filters may be applied to the reconstructed picture data to improve the quality of the reference picture data used for encoding/decoding of subsequent pictures. The in-loop filters may include a deblocking filter 330, a sample adaptive offset filter (SAO) 332, and an adaptive loop filter (ALF) 334. The in-loop filters 330, 332, 334 are applied to each reconstructed LCU in the picture and the final filtered reference picture data is provided to the storage component 318. In some embodiments, the ALF component 334 is not present.

Figure 4:
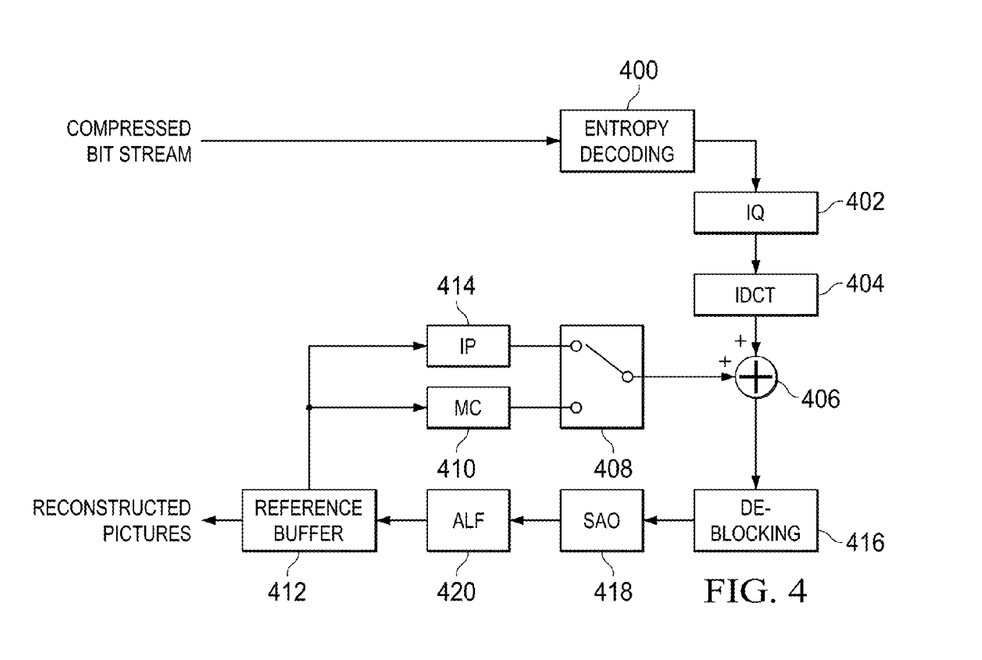
FIG. 4 is a block diagram of an example video decoder.

FIG. 4 is a block diagram of an example video decoder configured to verify during the decoding process that the slice rates of pictures are constrained to a maximum slice rate. The video decoder operates to reverse the encoding operations, i.e., entropy coding, quantization, transformation, and prediction, performed by the video encoder of FIGS. 3A and 3B to regenerate the pictures of the original video sequence. In view of the above description of a video encoder, one of ordinary skill in the art will understand the functionality of components of the video decoder without detailed explanation.

The entropy decoding component 400 receives an entropy encoded (compressed) video bit stream and reverses the entropy encoding using CABAC decoding to recover the encoded syntax elements, e.g., CU, PU, and TU structures of LCUs, quantized transform coefficients for CUs, motion vectors, prediction modes, weighted prediction parameters, SAO parameters, etc. The decoded syntax elements are passed to the various components of the decoder as needed. For example, decoded prediction modes are provided to the intra-prediction component (IP) 414 or motion compensation component (MC) 410. If the decoded prediction mode is an inter-prediction mode, the entropy decoder 400 reconstructs the motion vector(s) as needed and provides the motion vector(s) to the motion compensation component 410.

The entropy decoder 400 also recovers syntax elements indicating the profile and level used to encode the bit stream. The decoder may then compute an expected maximum slice rate (maximum number of slices per second) for pictures in the bit stream based on parameter values defined for the level. Computation of the maximum slice rate is previously discussed herein. The decoder may then use this maximum slice rate to verify that the slice rate for each picture is less than or equal to the maximum slice rate. In some embodiments, the decoder computes a maximum number of slices for each picture based on the maximum slice rate constraint and then counts the number of slices in the picture as the picture is decoded to verify that the number of slices is than or equal to the computed maximum slice number. The decoder computes the maximum number of slices for a picture (for a fixed frame rate or a variable frame rate) in the same manner as the encoder. The decoder may take any suitable action if the number of slices exceeds the computed maximum number. The particular action taken by the decoder may depend on the application using the decoder. For example, the decoder may skip decoding a few slices in the picture to meet real-time requirements.

The inverse quantize component (IQ) 402 de-quantizes the quantized transform coefficients of the CUs. The inverse transform component 404 transforms the frequency domain data from the inverse quantize component 402 back to the residual CUs. That is, the inverse transform component 404 applies an inverse unit transform, i.e., the inverse of the unit transform used for encoding, to the de-quantized residual coefficients to produce reconstructed residual values of the CUs.

A residual CU supplies one input of the addition component 406. The other input of the addition component 406 comes from the mode switch 408. When an inter-prediction mode is signaled in the encoded video stream, the mode switch 408 selects predicted PUs from the motion compensation component 410 and when an intra-prediction mode is signaled, the mode switch selects predicted PUs from the intra-prediction component 414.

The motion compensation component 410 receives reference data from the storage component 412 and applies the motion compensation computed by the encoder and transmitted in the encoded video bit stream to the reference data to generate a predicted PU. That is, the motion compensation component 410 uses the motion vector(s) from the entropy decoder 400 and the reference data to generate a predicted PU.

The intra-prediction component 414 receives reconstructed samples from previously reconstructed PUs of a current picture from the storage component 412 and performs the intra-prediction computed by the encoder as signaled by an intra-prediction mode transmitted in the encoded video bit stream using the reconstructed samples as needed to generate a predicted PU.

The addition component 406 generates a reconstructed CU by adding the predicted PUs selected by the mode switch 408 and the residual CU. The output of the addition component 406, i.e., the reconstructed CUs, is stored in the storage component 412 for use by the intra-prediction component 414.

In-loop filters may be applied to reconstructed picture data to improve the quality of the decoded pictures and the quality of the reference picture data used for decoding of subsequent pictures. The applied in-loop filters are the same as those of the encoder, i.e., a deblocking filter 416, a sample adaptive offset filter (SAO) 418, and an adaptive loop filter (ALF) 420. The in-loop filters may be applied on an LCU-by-LCU basis and the final filtered reference picture data is provided to the storage component 412. In some embodiments, the ALF component 420 is not present.

Figure 5:
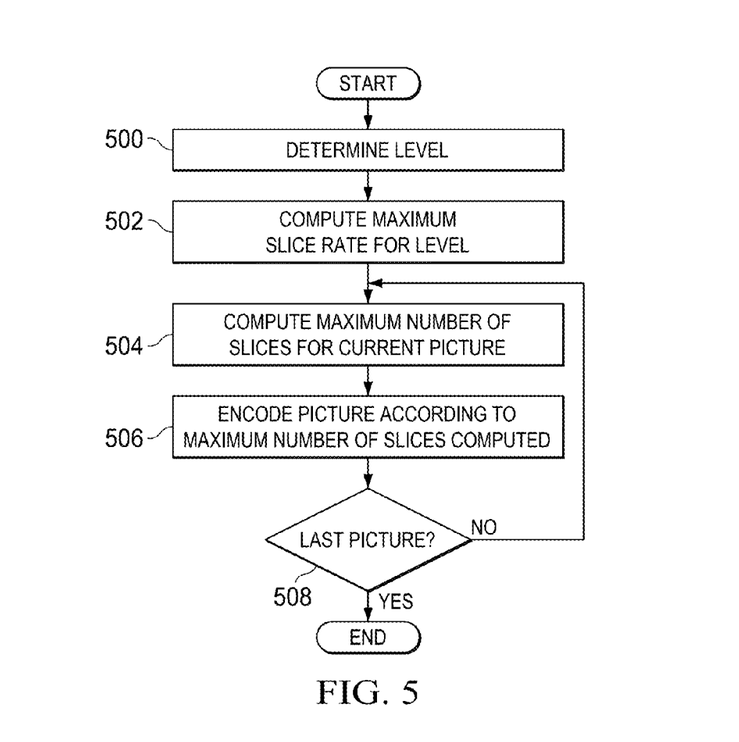
FIGS. 5 and 6 are flow diagrams of methods.

FIG. 5 is a flow diagram of a method for constraining slice header processing overhead during encoding of a video sequence that may be performed, for example, by the encoder of FIGS. 3A and 3B. Initially, the level of the video sequence is determined 500. As previously discussed, an encoder knows the picture size, bit-rate, frame-rate requirements of the incoming video. The encoder may use this information to perform a table lookup in a level table such as that of FIG. 1 to select the minimum level that satisfies the performance needs of the incoming video.

The maximum (worst case) slice rate for the level is then computed 502. Computation of the maximum slice rate for a level is previously described herein. Then, the number of slices in each picture of the video sequence is constrained to be less than or equal to a maximum number of slices computed for each picture based on the maximum slice rate. More specifically, for each picture 508, a maximum number of slices is computed 504 based on the maximum slice rate, and the picture is encoded 506 according to the computed maximum number of slices, i.e., during the encoding, the number of slices in the picture is constrained to be less than or equal to the computed maximum number of slices. Computation of the maximum number of slices for a picture for either a fixed frame rate or a variable frame rate is previously described herein.

Using the method of FIG. 5, the worst case slice header processing overhead remains constant for a level. Taking level 5 in the table of FIG. 1 as an example, the maximum number of slices allowed in a picture becomes 200, 50, and 25 for 4 k×2K@30, 1080p@120 and 720p@240, respectively, and the worst case number slices per second is constant for level 5, i.e., 6000 slices/sec, independent of frame-rates and picture sizes.

Figure 6:
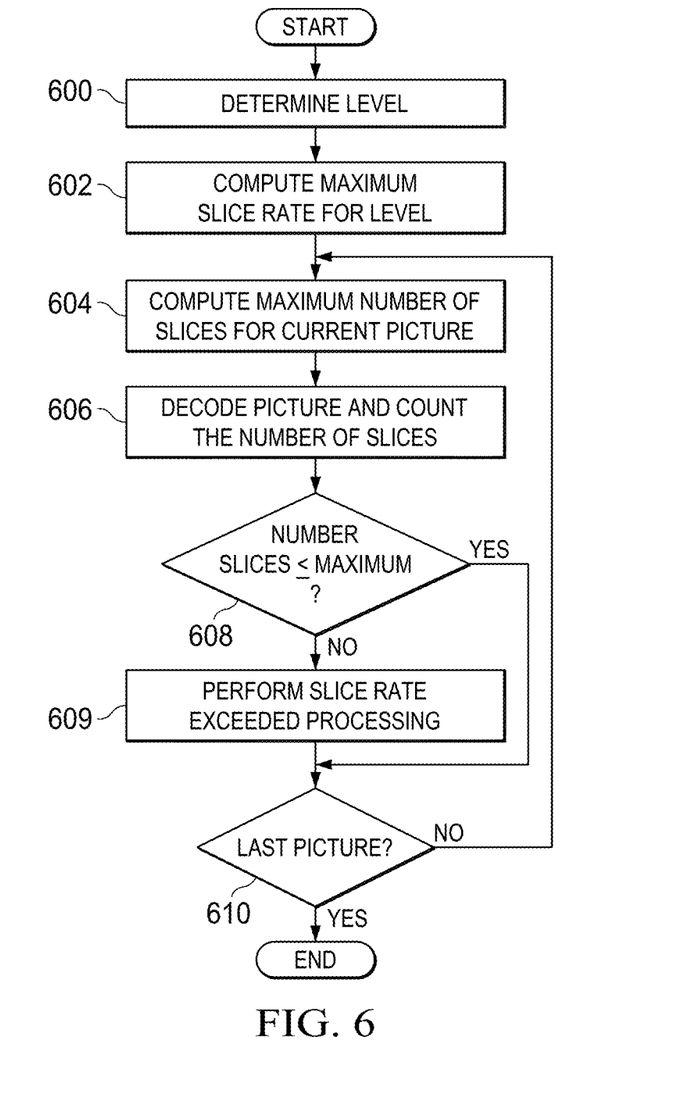

FIG. 6 is a flow diagram of method for verifying that slice header processing overhead is constrained to a maximum slice rate during decoding of a compressed video bit stream that may be performed, for example, by the decoder of FIG. 4. Initially, the level of the compressed bit stream is determined 600 by decoding an indication of the level from the bit stream. The maximum (worst case) slice rate for the level is then computed 602. Computation of the maximum slice rate for a level is performed in the same manner as in the encoder and is previously described herein. Then, the number of slices in each picture encoded in the bit stream is counted as each picture is decoded and the count is verified against a maximum number of slices computed for each picture based on the maximum slice rate. More specifically, for each picture 610, a maximum number of slices is computed 604 based on the maximum slice rate and, as the picture is decoded 606, the number of slices in the picture is counted. Computation of the maximum number of slices for a picture for either a fixed frame rate or a variable frame rate is previously described herein.

If the number of slices in the picture is less than or equal to 608 the computed maximum number of slices, processing continues with the next picture, if any 610, in the compressed bit stream. Otherwise, the number of slices in the picture exceeds the maximum number. In such a case, any suitable processing may be performed 609 to compensate for exceeding the maximum slice rate. For example, the decoding of a few slices or pictures may be skipped to meet real-time decoding requirements. Once the slice rate exceeded processing is complete, processing continues with the next picture, if any 610.

Figure 8:
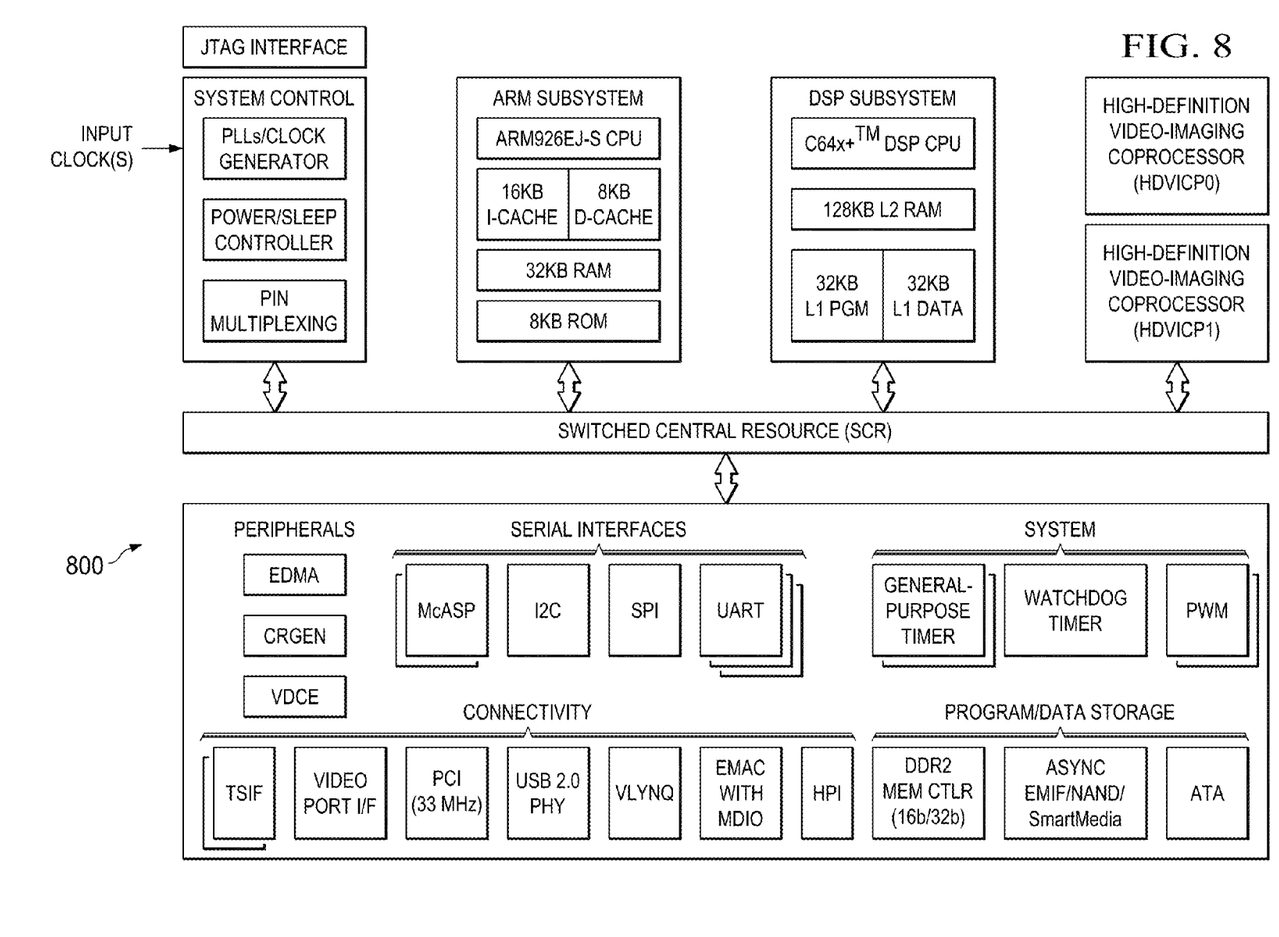
FIG. 8 is a block diagram of an illustrative digital system.

FIG. 8 is a block diagram of an example digital system suitable for use as an embedded system that may be configured to constrain the slice rate per picture during the encoding process to be less than or equal to a worst case number of slices per second rate as described herein during encoding of a video stream and/or to verify that the slice rates of pictures are constrained to a maximum slice rate during decoding of an encoded video bit stream as described herein. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 800 is a programmable platform designed to meet the processing needs of applications such as video encode/decode/transcode/transrate, video surveillance, video conferencing, set-top box, medical imaging, media server, gaming, digital signage, etc. The SoC 800 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 800 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+™ core with a very-long-instruction-word (VLIW) architecture. In general, the ARM is responsible for configuration and control of the SoC 800, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 800 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 8, the SoC 800 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding such as motion estimation, motion compensation, intra-prediction, transformation, and quantization. Further, the distinct circuitry in the HDVICP coprocessors that may be used for specific computation operations is designed to operate in a pipeline fashion under the control of the ARM subsystem and/or the DSP subsystem.

As was previously mentioned, the SoC 800 may be configured to constrain the slice rate per picture during the encoding process to be less than or equal to a worst case number of slices per second rate as described herein during encoding of a video stream and/or to verify that the slice rates of pictures are constrained to a maximum slice rate during decoding of an encoded video bit stream as described herein. For example, the coding control of the video encoder of FIGS. 3A and 3B may be executed on the DSP subsystem or the ARM subsystem and at least some of the computational operations of the block processing, including the intra-prediction and inter-prediction of mode selection, transformation, quantization, and entropy encoding may be executed on the HDVICP coprocessors. Similarly, at least some of the computational operations of the various components of the video decoder of FIG. 4, including entropy decoding, inverse quantization, inverse transformation, intra-prediction, and motion compensation may be executed on the HDVICP coprocessors.

Other Embodiments

While the invention has been described with respect to a limited number of embodiments, those skilled in the art, having benefit of this disclosure, will appreciate that other embodiments can be devised which do not depart from the scope of the invention as disclosed herein.

For example, in versions of HEVC after HEVC Draft 8, the concept of a slice segment is introduced. A slice segment may be a dependent slice or an independent slice, and a picture may contain both types of slice segments. One of ordinary skill in the art will understand embodiments in which the number of slices per second rate encompasses both dependent and independent slices.

In another example, embodiments have been described herein in which the maximum number of slices in a picture is computed as the minimum of the maximum number of slices specified for a level and a number of slices computed based on the maximum slice rate. One of ordinary skill in the art will understand embodiments in which rather than setting the maximum number of slices for a picture as the minimum of the two slice counts, the maximum number of slices per picture is set to the number of slices computed based on the maximum slice rate, i.e., to MaxSliceRate/FrameRate for fixed frame rate pictures and MaxSliceRate*(t(n)−t(n−1) for variable frame rate pictures.

In another example, embodiments have been described herein in which the maximum number of slices for a picture is dependent on the frame rate. One of ordinary skill in the art will understand embodiments in which the maximum number of slices may be computed independent of the frame rate given the luma picture size of a picture. In such embodiments, the maximum number of slices for a picture may be computed as $$\text{MaxSlicesPerPicture} * \text{PicSizeInSamplesY} / \text{MaxLumaPS}$$

where MaxSlicesPerPicture and MaxLumaPS are previously defined herein. For a level, PicSizeInSamplesY may be determined as the product of the height and width of a luma picture and is always less than or equal to MaxLumaPS.

Embodiments of the methods, encoders, and decoders described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

It is therefore contemplated that the appended claims will cover any such modifications of the embodiments as fall within the true scope of the invention.

The invention claimed is:

1. A method for encoding a picture of a video sequence in a bit stream, the method comprising:
   computing, with one or more processors, a maximum slice rate for the video sequence;
   setting a value of a maximum number of slices for the picture as a minimum of a maximum number of slices per picture specified for the video sequence and the maximum slice rate multiplied by a difference in display time between the picture and a picture immediately preceding the picture in display order; and
   encoding, with the one or more processors, the picture wherein a number of slices used to encode the picture is enforced to be no more than the maximum number of slices.

2. The method of claim 1, wherein computing a maximum slice rate comprises computing the maximum slice rate as MaxLumaSR/MaxLumaPS*MaxSlicesPerPicture, wherein MaxLumaSR is a maximum luma sample rate specified for the video sequence, MaxLumaPS is a maximum luma picture size in samples specified for the video sequence, and MaxSlicesPerPicture is a maximum number of slices per picture specified for the video sequence.

3. The method of claim 2, further comprising:
   determining a level for the video sequence, wherein the level specifies values for MaxLumaSR, MaxLumaPS, and MaxSlicesPerPicture.

4. An apparatus configured to encode a picture of a video sequence in a bit stream, the apparatus comprising one or more processors configured to:
   compute a maximum slice rate for the video sequence;
   set a value of a maximum number of slices for the picture as a minimum of a maximum number of slices per picture specified for the video sequence and the maximum slice rate multiplied by a difference in display time between the picture and a picture immediately preceding the picture in display order; and
   encode the picture wherein a number of slices used to encode the picture is enforced to be no more than the maximum number of slices.

5. The apparatus of claim 4, wherein the one or more processors are further configured to compute the maximum slice rate as MaxLumaSR/MaxLumaPS*MaxSlicesPerPicture, wherein MaxLumaSR is a maximum luma sample rate specified for the video sequence, MaxLumaPS is a maximum luma picture size in samples specified for the video sequence, and MaxSlicesPerPicture is a maximum number of slices per picture specified for the video sequence.

6. The apparatus of claim 5, wherein the one or more processors are further configured to:
   determine a level for the video sequence, wherein the level specifies values for MaxLumaSR, MaxLumaPS, and MaxSlicesPerPicture.

7. An apparatus configured to encode a picture of a video sequence in a bit stream, the apparatus comprising one or more processors configured to:
   compute a maximum slice rate for the video sequence;
   set a value of a maximum number of slices for the picture as a minimum of a maximum number of slices per picture specified for the video sequence and the maximum slice rate divided by a frame rate of the video sequence; and
   encode the picture wherein a number of slices used to encode the picture is enforced to be no more than the maximum number of slices.

* * * * *